(12) United States Patent
Nitta et al.

(10) Patent No.: US 12,313,821 B2
(45) Date of Patent: May 27, 2025

(54) CAMERA LENS

(71) Applicant: AAC Optics (Changzhou) Co., Ltd., Changzhou (CN)

(72) Inventors: Koji Nitta, Osaka (JP); Hiroyuki Teraoka, Osaka (JP)

(73) Assignee: AAC Optics (Changzhou) Co., Ltd., Changzhou (CN)

(*) Notice: Subject to any disclaimer, the term of this patent is extended or adjusted under 35 U.S.C. 154(b) by 743 days.

(21) Appl. No.: 17/562,039

(22) Filed: Dec. 27, 2021

(65) Prior Publication Data

US 2022/0317421 A1 Oct. 6, 2022

(30) Foreign Application Priority Data

Mar. 30, 2021 (JP) .................................. 2021-058864

(51) Int. Cl.
*G02B 13/00* (2006.01)
*G02B 9/64* (2006.01)
*G02B 27/00* (2006.01)

(52) U.S. Cl.
CPC ........... *G02B 13/0045* (2013.01); *G02B 9/64* (2013.01); *G02B 27/0025* (2013.01)

(58) Field of Classification Search
CPC ...... G02B 9/62; G02B 13/0045; G02B 13/22; G02B 13/04
USPC ................ 359/713, 708, 756, 757, 752, 745
See application file for complete search history.

(56) References Cited

U.S. PATENT DOCUMENTS

| 8,743,482 | B1* | 6/2014 | Tsai | G02B 9/62 |
| | | | | 359/757 |
| 8,885,268 | B2* | 11/2014 | Tang | G02B 13/18 |
| | | | | 359/713 |
| 9,958,650 | B1* | 5/2018 | Gong | G02B 9/62 |
| 11,782,245 | B2* | 10/2023 | Peng | G02B 9/60 |
| | | | | 359/757 |
| 2012/0194726 | A1* | 8/2012 | Huang | G02B 13/0045 |
| | | | | 359/713 |
| 2014/0192422 | A1* | 7/2014 | Tang | G02B 13/0045 |
| | | | | 359/713 |
| 2014/0320981 | A1* | 10/2014 | Hsieh | G02B 9/62 |
| | | | | 359/713 |
| 2020/0409047 | A1* | 12/2020 | Wang | G02B 13/06 |
| 2022/0308316 | A1* | 9/2022 | Nitta | G02B 9/62 |

* cited by examiner

*Primary Examiner* — Zachary W Wilkes
*Assistant Examiner* — Elizabeth M Hall
(74) *Attorney, Agent, or Firm* — Wiersch Law Group (57) ABSTRACT

The present invention relates to a field of optical lens, and discloses a camera lens with six-piece lenses including a first lens having a positive refractive power, a second lens having a negative refractive power, a third lens, a fourth lens having a positive refractive power, a fifth lens, and a sixth lens having a negative refractive power. The camera lens satisfies following conditions: in an imaging status TTL/LB≤2.40, 0.20≤R1/R2≤0.35, 0.20≤R1/R2≤0.35, 0.02≤d5/f≤0.04, and −0.90≤f2/f≤−0.70. The present invention has a small height in a retraction status, and a narrow angle as well as good optical properties in the imaging status.

3 Claims, 8 Drawing Sheets

CAMERA LENS

FIELD OF THE PRESENT INVENTION

The present invention relates to a camera lens, and more particularly, to an invention of a camera lens suitable for camera assemblies, digital cameras, or the like for smartphones, which adopt camera elements such as CCDs and CMOS for high pixels. The camera lens in the invention is a camera lens in an imaging status with a narrow angle of 50° or less at full viewing angle (hereinafter referred as $2\omega$) and having good optical properties, while in a retraction status, the camera lens has a TTL/IH of 1.50 or less, and involves a small height in the retraction status. The camera lens consists of six-piece lenses.

DESCRIPTION OF RELATED ART

As in the camera lens, the TTL (total optical length of the camera lens) becomes longer and the field of view gets narrower, in recent years such a camera lens is needed that: the camera lens could possess a narrow angle and good optical properties in the imaging status, while in the retraction status the lens barrel could be contracted into the camera for obtaining a shorter TTL and a lower height during retraction.

There is a technology development of a camera lens is being promoted, the camera lens consisting of six-piece lenses and including a narrow angle and good optical properties. As a camera lens of a six-piece lenses structure, the camera lens in a related art consists of six-piece lenses, including from an object side to an image side in sequence: a first lens with a positive refractive power, a second lens with a negative refractive power, a third lens with a negative refractive power, a fourth lens with a positive refractive power, a fifth lens with a negative refractive power, and a sixth lens with a negative refractive power.

Although the $2\omega$ of the camera lens the related art is narrowed to 46.6° or less, the ratio of TTL in the imaging status to LB in the imaging status is still not sufficient, and therefore the height in the retraction status is also not reduced sufficiently.

SUMMARY

In the present invention, a camera lens is provided. The camera lens has a small height in a retraction status, while in an imaging status, the camera lens could have a narrow angle and good optical properties, and the camera lens consists of six-piece lenses.

Inventors of the present invention carefully studied a ratio of TTL to LB (back focus length) in the imaging status, a ratio of a central curvature radius of an object side surface of a first lens to a central curvature radius of an image side surface of the first lens, a ratio of a center thickness of a third lens to a focal length of the whole camera lens, and a ratio of a focal length of a second lens to the focal length of the whole camera lens, it was found that a camera lens that can resolve the problems of the related art could be obtained, and the present invention is thus acquired.

According to one aspect of the present invention, a camera lens with six-piece lens is provided, comprising, from an object side to an image side in sequence: a first lens having a positive refractive power, a second lens having a negative refractive power, a third lens, a fourth lens having a positive refractive power, a fifth lens, and a sixth lens having a negative refractive power; and the camera lens satisfies the following conditions: in a imaging status, TTL/LB≤2.40, 0.20≤R1/R2≤0.35, 0.02 d5/f≤0.04, and −0.90≤f2/≤f≤−0.70. TTL denotes a total optical length (an on-axis distance from an object side surface of the first lens to an image surface of the camera lens along an optical axis), LB denotes a back focal length of the camera lens, R1 denotes a central curvature radius of the object side surface of the first lens, R2 denotes a central curvature radius of an image side surface of the first lens, d5 denotes a center thickness of the third lens, f denotes a focal length of the camera lens, and f2 denotes a focal length of the second lens.

As an improvement, the camera lens further satisfies a following condition: 0.29≤DL36/TTL(in the imaging status) 0.33, where DL36 denotes an on-axis distance from an object side surface of the third lens to an image side surface of the sixth lens.

As an improvement, the camera lens further satisfies a following condition: 0.10≤R7/R8≤0.55, where R7 denotes a central curvature radius of an object side surface of the fourth lens, and R8 denotes a central curvature radius of an image side surface of the fourth lens.

As an improvement, the camera lens further satisfies a following condition: 0.52≤f1/f≤0.58, where f denotes the focal length of the camera lens, and f1 denotes a focal length of the first lens.

Beneficial effects of the present invention are that: according to the present invention, a camera lens is particularly related, which is suitable for camera assemblies, digital cameras, or the like, for smartphones, which adopt camera elements such as CCDs and CMOS for high pixels. The camera lens in the invention, in an imaging status is a camera lens, with a narrow angle $2\omega \leq 50°$ and having good optical properties, while in a retraction status, TTL/IH≤1.50, and a small height in the retraction status is obtained, and the camera lens consists of six-piece lenses.

BRIEF DESCRIPTION OF THE DRAWINGS

In order to explain the technical solutions in the embodiments of the present invention more clearly, the following will briefly introduce the drawings that need to be used in the description of the embodiments. Obviously, the drawings in the following description are only some embodiments of the present invention. For those of ordinary skill in the art, without creative efforts, other drawings can be obtained based on these drawings, among which.

DETAILED DESCRIPTION OF THE EXEMPLARY EMBODIMENTS

The present invention is further illustrated with reference to the accompanying drawings and embodiments. To make the objects, technical solutions, and advantages of the present disclosure clearer, the embodiments of the present invention are described in detail with reference to the accompanying drawings below. A person of ordinary skill in the related art can understand that, in the embodiments of the present disclosure, many technical details are provided to make readers better understand this application. However, even without these technical details and any changes and modifications based on the following embodiments, technical solutions required to be protected by this application can be implemented.

Figure 1:
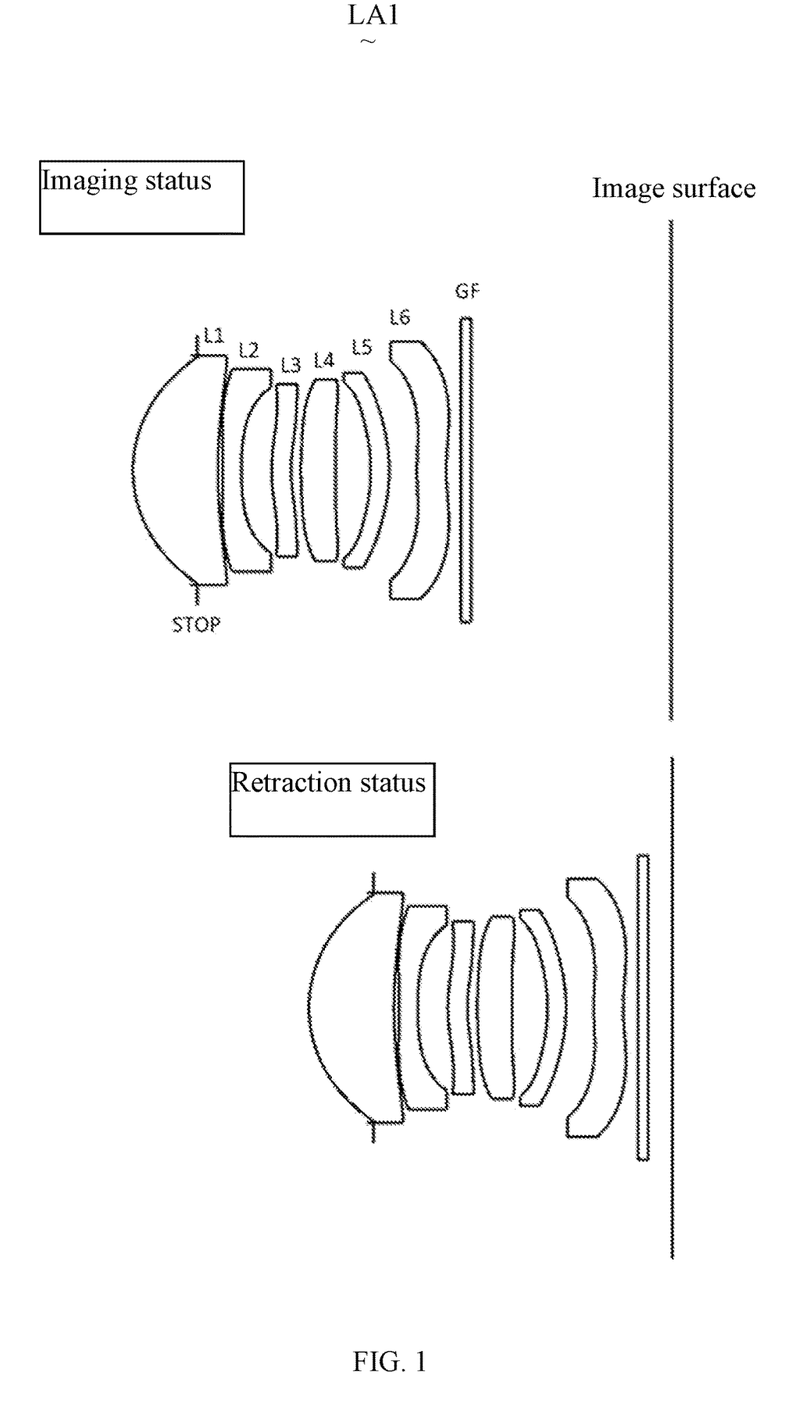
FIG. 1 is a schematic diagram of a general structure of a camera lens in accordance with Embodiment 1 of the present invention.

Embodiments of the camera lens in the present invention are described below. The camera lens LA1 has lens system of a six-piece lens structure. The six-piece lens structure, includes from an object side to an image side in sequence, a first lens L1, a second lens L2, a third lens L3, a fourth lens L4, a fifth lens L5, and a sixth lens L6. A glass plate GF is provided between the sixth lens L6 and an image surface. The glass plate GF can be a glass cover plate or an optical filter. In the present invention, the glass plate GF can be provided at different positions, or can be omitted.

The first lens L1 has a positive refractive power, the second lens L2 has a negative refractive power, the third lens L3 has a positive or negative refractive power, the fourth lens L4 has a positive refractive power, the fifth lens L5 has a positive or negative refractive power, and the sixth lens L6 has a negative refractive power. In order to correct various aberrations, it is desirable to design all surfaces of these six-piece lenses as aspherical surfaces.

The camera lens LA1 satisfies a following condition (1):

$$\text{in an imaging status, } TTL/LB \le 2.40 \quad (1)$$

The condition (1) specifies a ratio of a total optical length (an on-axis distance from an object side surface of the first lens to an image surface of the camera lens along an optical axis) TTL in an imaging status to a back focal length (an on-axis distance from an image side surface S12 of the sixth lens to the image surface) LB in the imaging status. If it is within the range of condition (1), a lowered height in a retraction status can be easily achieved, which is an improvement.

The camera lens LA1 further satisfies a following condition (2):

$$0.20 \le R1/R2 \le 0.35 \quad (2)$$

The condition (2) specifies a ratio of a central curvature radius R1 of an object side surface S1 of the first lens L1 to a central curvature radius R2 of an image side surface S2 of the first lens L1. If it is within the range of condition (2), the lowered height in the retraction status can be easily achieved and correction of various aberrations is easily realized with the narrowing of the field of view in the imaging status, which is an improvement.

The camera lens LA1 further satisfies a following condition (3):

$$0.02 \le d5/f \le 0.04 \quad (3)$$

The condition (3) specifies a ratio of a center thickness d5 of the third lens L3 to a focal length f of the whole camera lens LA1. If it is within the range of condition (3), the lowered height in the retraction status can be easily achieved and correction of various aberrations is easily realized with the narrowing of the field of view in the imaging status, which is an improvement.

The camera lens LA1 further satisfies a following condition (4):

$$-0.90 \le f2/f \le -0.70 \quad (4)$$

The condition (4) specifies a ratio of a focal length f2 of the second lens to the focal length f of the whole camera lens LA1. If it is within the range of condition (4), the lowered height in the retraction status can be easily achieved and correction of various aberrations is easily realized with the narrowing of the field of view in the imaging status, which is an improvement.

The camera lens LA1 further satisfies a following condition (5):

$$0.29 \le DL36/TTL(\text{in the imaging status}) \le 0.33 \quad (5)$$

The condition (5) specifies a ratio of an on-axis distance from an object side surface S5 of the third lens L3 to an image side surface S12 of the sixth lens L6 to the total optical length TTL of the camera lens in the imaging status. If it is within the range of condition (5), the lowered height in the retraction status can be easily achieved and correction of various aberrations is easily realized with the narrowing of the field of view in the imaging status, which is an improvement.

The camera lens LA1 further satisfies a following condition (6):

$$10 \le R7/R8 \le 0.55 \quad (6)$$

The condition (6) specifies a ratio of a central curvature radius R7 of an object side surface S7 of the fourth lens L4 to a central curvature radius R8 of an image side surface S8 of the fourth lens L4. If it is within the range of condition (6), the lowered height in the retraction status can be easily achieved and correction of various aberrations is easily realized with the narrowing of the field of view in the imaging status, which is an improvement.

The camera lens LA1 further satisfies a following condition (7):

$$0.52 \le f1/f \le 0.58 \quad (7)$$

The condition (7) specifies a ratio of a focal length f1 of the third lens L1 to the focal length f of the whole camera lens LA1. If it is within the range of condition (7), the lowered height in the retraction status can be easily achieved and correction of various aberrations is easily realized with the narrowing of the field of view in the imaging status, which is an improvement.

The six-piece lenses of the camera lens LA1 satisfy the above construction and conditions, so as to obtain the camera lens consisting of six-piece lenses, and in the imaging status the camera lens has a narrow angle 2ω≤50° and good optical properties, while in the retraction status, TTL/IH≤1.50, and a small height in the retraction status is obtained.

The camera lens LA1 of the present invention will be described with reference to the embodiments below. The reference signs described in the embodiments are listed below. In addition, the distance, radius and center thickness are all in a unit of mm.

f: focal length of the camera lens LA1;
f1: focal length of the first lens L1;
f2: focal length of the second lens L2;

f3: focal length of the third lens L3;
f4: focal length of the fourth lens L4;
f5: focal length of the fifth lens L5;
f6: focal length of the sixth lens L6;
FNO: F number;
2ω: full field of view;
STOP: aperture;
R: curvature radius of an optical surface, or a central curvature radius for a lens;
R1: curvature radius of the object side surface S1 of the first lens L1;
R2: curvature radius of the image side surface S2 of the first lens L1;
R3: curvature radius of an object side surface S3 of the second lens L2;
R4: curvature radius of an image side surface S4 of the second lens L2;
R5: curvature radius of the object side surface S5 of the third lens L3;
R6: curvature radius of an image side surface S6 of the third lens L3;
R7: curvature radius of the object side surface S7 of the fourth lens L4;
R8: curvature radius of the image side surface S8 of the fourth lens L4;
R9: curvature radius of an object side surface S9 of the fifth lens L5;
R10: curvature radius of an image side surface S10 of the fifth lens L5;
R11: curvature radius of an object side surface S11 of the sixth lens L6;
R12: curvature radius of the image side surface S12 of the sixth lens L6;
R13: curvature radius of an object side surface S13 of the glass plate GF;
R14: curvature radius of an image side surface S14 of the glass plate GF;
d: center thickness or distance between lenses;
d0: on-axis distance from the aperture STOP to the object side surface S1 of the first lens L1;
d1: center thickness of the first lens L1;
d2: on-axis distance from the image side surface S2 of the first lens L1 to the object side surface S3 of the second lens L2;
d3: center thickness of the second lens L2;
d4: on-axis distance from the image side surface S4 of the second lens L2 to the object side surface S5 of the third lens L3;
d5: center thickness of the third lens L3;
d6: on-axis distance from the image side surface S6 of the third lens L3 to the object side surface S7 of the fourth lens L4;
d7: center thickness of the fourth lens L4;
d8: on-axis distance from the image side surface S8 of the fourth lens L4 to the object side surface S9 of the fifth lens L5;
d9: center thickness of the fifth lens L5;
d10: on-axis distance from the image side surface S10 of the fifth lens L5 to the object side surface S11 of the sixth lens L6;
d11: center thickness of the sixth lens L6;
d12: on-axis distance from the image side surface S12 of the sixth lens L6 to the object side surface S13 of the glass plate GF;
d13: center thickness of the glass plate GF;
d14: on-axis distance from the image side S14 surface S14 of the glass plate GF to the image surface;
DL36: on-axis distance from the object side surface S5 of the third lens L3 to the image side surface S12 of the sixth lens L6;
nd: refractive index of d line;
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6;
ndg: refractive index of d line of the glass plate GF;
v: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
vg: abbe number of the glass plate GF;
TTL: on-axis distance from the object side surface of the first lens to an image surface of the camera lens along the optical axis;
LB: back focal length of the camera lens (on-axis distance from the image side surface S12 of the sixth lens L6 to the image surface); and
IH denotes an image height.

Embodiment 1

FIG. 1 is a schematic diagram of a camera lens LA1 according to Embodiment 1 of the present invention. Central curvature radiuses R of the image side surfaces and object side surfaces of the first lens L1 to the sixth lens L6 of the camera lens LA1 according to the Embodiment 1, the center thicknesses of the lenses, or distances d between the lenses, refractive indexes nd, abbe numbers vd are shown in Table 1; values of A are shown in Table 2; conic coefficients k and aspheric coefficients are shown in Table 3; and 2ω, FNO, f, f1, f2, f3, f4, f5, f6, TTL, and IH are shown in Table 4.

TABLE 1

| | | R | d | nd | vd | Effective radius (mm) |
|---|---|---|---|---|---|---|
| Stop | | ∞ | d0= −1.327 | | | 2.396 |
| S1 | R1 | 2.64718 | d1= 1.750 | nd1 1.5444 | v1 55.82 | 2.401 |
| S2 | R2 | 7.67299 | d2= 0.108 | | | 2.193 |
| S3 | R3 | −16.55940 | d3= 0.380 | nd2 1.6359 | v2 23.82 | 2.124 |
| S4 | R4 | 7.55284 | d4= 0.620 | | | 1.729 |
| S5 | R5 | 3.20191 | d5= 0.402 | nd3 1.6501 | v3 21.44 | 1.720 |
| S6 | R6 | 2.76999 | d6= 0.204 | | | 1.794 |
| S7 | R7 | 7.04221 | d7= 0.716 | nd4 1.6152 | v4 25.94 | 1.900 |
| S8 | R8 | 67.06866 | d8= 0.726 | | | 1.878 |
| S9 | R9 | −3.85523 | d9= 0.381 | nd5 1.6700 | v5 19.39 | 1.850 |

TABLE 1-continued

|  | R | d |  | nd |  | vd | Effective radius (mm) |
|---|---|---|---|---|---|---|---|
| S10 | R10 −4.25262 | d10= | 0.573 |  |  |  | 2.029 |
| S11 | R11 6.00986 | d11= | 0.606 | nd6 | 1.5444 | v6 55.82 | 2.285 |
| S12 | R12 4.72250 | d12= | 0.300 |  |  |  | 2.687 |
| S13 | R13 ∞ | d13= | 0.210 | ndg | 1.5168 | vg 64.20 | 3.106 |
| S14 | R14 ∞ | d14= | A |  |  |  | 3.171 |

Reference wavelength = 588 nm

TABLE 2

|  | In an imaging status | In a retraction status |
|---|---|---|
| A | 4.125 | 0.500 |

TABLE 3

|  | Cone coefficient | Aspheric surface coefficients | | | | |
|---|---|---|---|---|---|---|
|  | k | A4 | A6 | A8 | A10 | A12 |
| S1 | 0.0000E+00 | −6.3252E−04 | −1.0710E−03 | 9.6084E−04 | −5.6415E−04 | 1.9911E−04 |
| S2 | 0.0000E+00 | −3.2063E−02 | 2.6470E−02 | −1.6289E−02 | 7.2976E−03 | −2.2248E−03 |
| S3 | 0.0000E+00 | 7.4586E−03 | 2.8174E−02 | −2.5240E−02 | 1.1947E−02 | −3.2779E−03 |
| S4 | 0.0000E+00 | 3.0858E−02 | 3.1749E−02 | −4.7021E−02 | 4.3470E−02 | −2.8808E−02 |
| S5 | 0.0000E+00 | −8.4964E−02 | 4.4509E−02 | −4.2074E−02 | 3.5385E−02 | −2.3450E−02 |
| S6 | 0.0000E+00 | −1.3353E−01 | 5.1467E−02 | −8.1885E−03 | −7.4375E−03 | 9.4545E−03 |
| S7 | 0.0000E+00 | −5.0260E−02 | 2.0827E−02 | 1.3185E−02 | −1.1161E−02 | 2.3284E−03 |
| S8 | 0.0000E+00 | −9.2341E−03 | 1.7666E−02 | −6.2964E−03 | 4.0090E−03 | −5.5211E−03 |
| S9 | 0.0000E+00 | −2.9818E−02 | 6.7097E−02 | −7.0067E−02 | 5.8413E−02 | −3.6968E−02 |
| S10 | 0.0000E+00 | −4.9073E−02 | 6.6455E−02 | −4.8545E−02 | 2.7667E−02 | −1.2246E−02 |
| S11 | 0.0000E+00 | −1.0229E−01 | 4.5060E−02 | −1.6157E−02 | 3.2462E−03 | 1.1640E−04 |
| S12 | 0.0000E+00 | −7.5377E−02 | 2.7944E−02 | −1.0316E−02 | 3.0242E−03 | −6.5577E−04 |

|  | Cone coefficient | Aspheric surface coefficients | | | |
|---|---|---|---|---|---|
|  | k | A14 | A16 | A18 | A20 |
| S1 | 0.0000E+00 | −4.3335E−05 | 5.3764E−06 | −3.2080E−07 | 4.1313E−09 |
| S2 | 0.0000E+00 | 4.3210E−04 | −5.0574E−05 | 3.2480E−06 | −8.8235E−08 |
| S3 | 0.0000E+00 | 4.8539E−04 | −2.6745E−05 | −1.5267E−06 | 1.9167E−07 |
| S4 | 0.0000E+00 | 1.3481E−02 | −4.0696E−03 | 6.9956E−04 | −5.1361E−05 |
| S5 | 0.0000E+00 | 1.1486E−02 | −3.7046E−03 | 6.8178E−04 | −5.3736E−05 |
| S6 | 0.0000E+00 | −5.4968E−03 | 1.7645E−03 | −2.9679E−04 | 2.0357E−05 |
| S7 | 0.0000E+00 | 3.5129E−04 | −2.5064E−04 | 4.5220E−05 | −2.9845E−06 |
| S8 | 0.0000E+00 | 3.5506E−03 | −1.1632E−03 | 1.9486E−04 | −1.3300E−05 |
| S9 | 0.0000E+00 | 1.5462E−02 | −4.0164E−03 | 5.8691E−04 | −3.6634E−05 |
| S10 | 0.0000E+00 | 3.6617E−03 | −6.7289E−04 | 6.8606E−05 | −2.9688E−06 |
| S11 | 0.0000E+00 | −2.8553E−04 | 8.1420E−05 | −1.0535E−05 | 5.3475E−07 |
| S12 | 0.0000E+00 | 9.7944E−05 | −9.2638E−06 | 4.8312E−07 | −1.0121E−08 |

Herein, k is a conic coefficient, A4, A6, A8, A10, A12, A14, A16, A18 and A20 are aspheric surface coefficients.

$$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}+A18x^{18}+A20x^{20} \quad (8)$$

Herein, x is a vertical distance between a point on an aspherical curve and the optical axis, and y is an aspherical depth (a vertical distance between a point on an aspherical surface, having a distance of x from the optical axis, and a surface tangent to a vertex of the aspherical surface on the optical axis).

For convenience, an aspheric surface of each lens surface adopts the aspheric surfaces shown in the condition (8). However, the present invention is not limited to the aspherical polynomials form shown in the condition (8).

TABLE 4

| | |
|---|---|
| 2ω (°) | 47.25 |
| FNO | 2.40 |
| f (mm) | 11.500 |
| f1 (mm) | 6.613 |
| f2 (mm) | −8.108 |
| f3 (mm) | −49.912 |
| f4 (mm) | 12.732 |
| f5 (mm) | −100.000 |
| f6 (mm) | −48.559 |
| TTL (mm) in the imaging status | 11.100 |
| TTL (mm) in the retraction status | 7.475 |
| IH (mm) | 5.120 |
| TTL/IH in the imaging status | 2.168 |
| TTL/IH in the retraction status | 1.460 |

The following Table 17 shows corresponding values of the parameters defined in the conditions (1) to (7) of Embodiments 1-4.

As shown in Table 17, Embodiment 1 satisfies the conditions (1) to (7).

Figure 2:
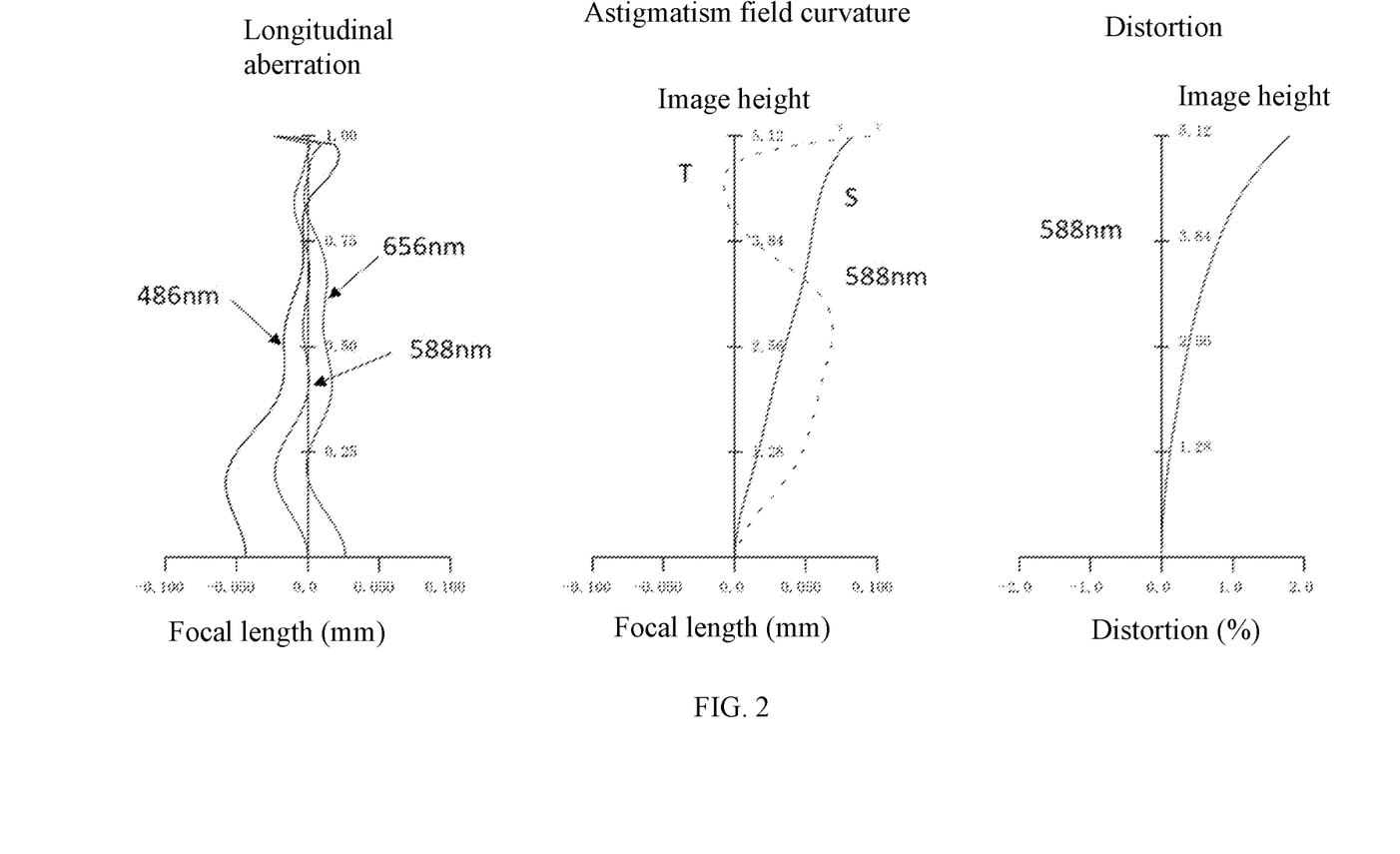
FIG. 2 is a schematic diagram of a longitudinal aberration, an astigmatism field curvature and a distortion of the camera lens shown in FIG. 1.

FIG. 2 illustrates a spherical aberration, an astigmatism field curvature, and a distortion of the camera lens LA1 according to Embodiment 1. In addition, in FIG. 2, S is a field curvature for a sagittal image plane, and T is a field curvature for a meridional image surface, which are the same for Embodiments 2-4. As shown in FIG. 2, the camera lens LA1 according to Embodiment 1 has a narrow angle of 2ω=47.25°, and a small height in the retraction status, i.e., TTL/IH=1.460, and good optical properties.

Embodiment 2

Figure 3:
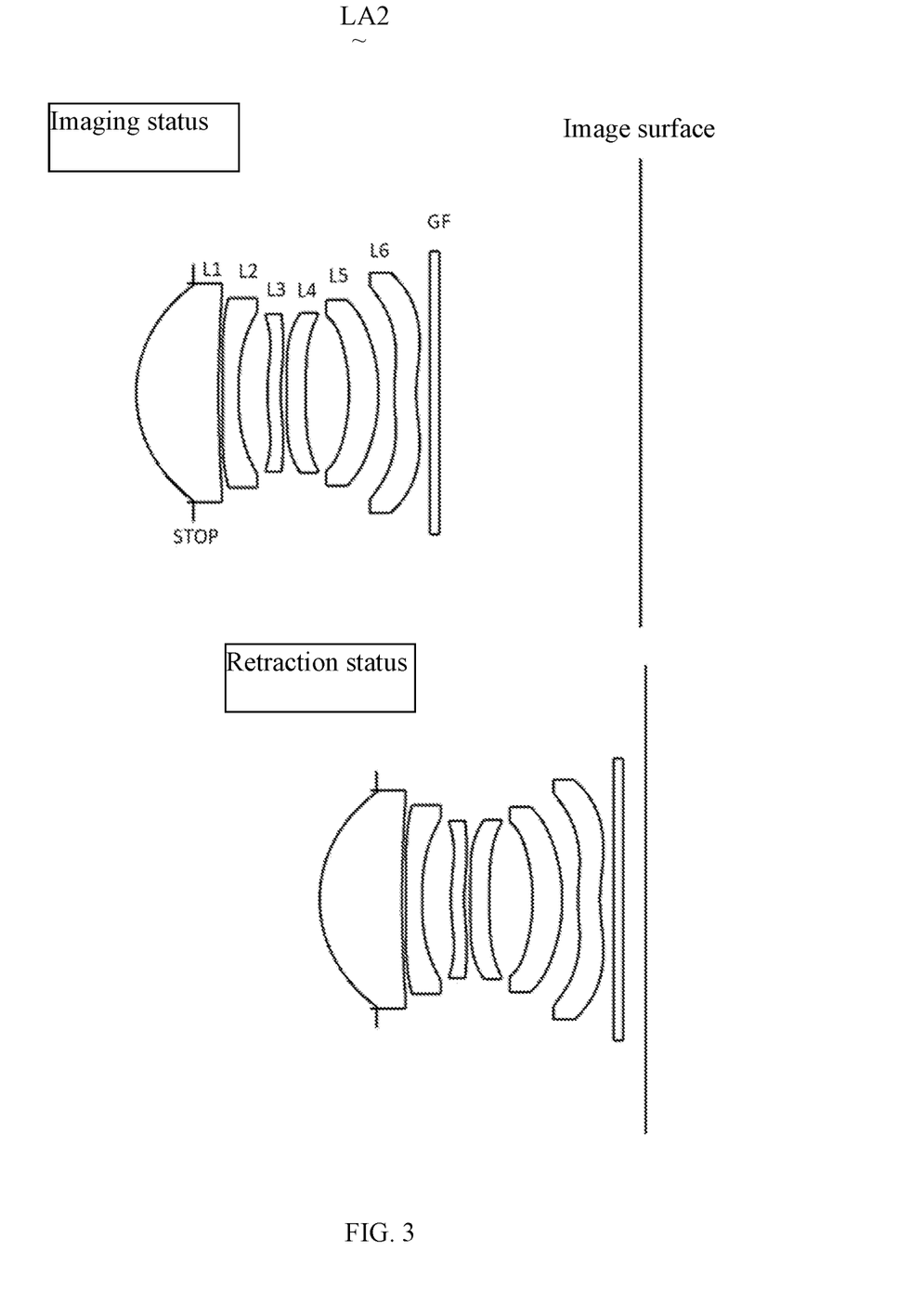
FIG. 3 is a schematic diagram of a general structure of a camera lens in accordance with Embodiment 2 of the present invention.

FIG. 3 is a schematic diagram of a camera lens LA2 according to Embodiment 2 of the present invention, which illustrates the configurations of the camera lens LA2 in an imaging status and a retraction status separately. Central curvature radiuses R of an image side surfaces and object side surfaces of a first lens L1 to a sixth lens L6 of the camera lens LA2 according to the Embodiment 2, center thicknesses of the lenses, or distances d between the lenses, refractive indexes nd, abbe numbers vd are shown in Table 5; values of A are shown in Table 6; conic coefficients k and aspheric coefficients are shown in Table 7; and 2ω, FNO, f, f1, f2, f3, f4, f5, f6, TTL, and IH are shown in Table 8.

TABLE 5

| | | R | d | nd | vd | Effective radius (mm) |
|---|---|---|---|---|---|---|
| Stop | | ∞ | d0= −1.258 | | | 2.436 |
| S1 | R1 | 2.81234 | d1= 1.808 | nd1 1.5444 | v1 55.82 | 2.436 |
| S2 | R2 | 13.71873 | d2= 0.093 | | | 2.204 |
| S3 | R3 | −43.88017 | d3= 0.350 | nd2 1.6359 | v2 23.82 | 2.111 |
| S4 | R4 | 7.86986 | d4= 0.634 | | | 1.799 |
| S5 | R5 | 4.04515 | d5= 0.292 | nd3 1.6501 | v3 21.44 | 1.720 |
| S6 | R6 | 3.54740 | d6= 0.132 | | | 1.748 |
| S7 | R7 | 16.28474 | d7= 0.424 | nd4 1.6152 | v4 25.94 | 1.783 |
| S8 | R8 | 29.88025 | d8= 0.949 | | | 1.711 |
| S9 | R9 | −4.14052 | d9= 0.649 | nd5 1.6700 | v5 19.39 | 1.730 |
| S10 | R10 | −4.69071 | d10= 0.346 | | | 2.069 |
| S11 | R11 | 3.59453 | d11= 0.483 | nd6 1.5444 | v6 55.82 | 2.387 |
| S12 | R12 | 3.21210 | d12= 0.300 | | | 2.679 |
| S13 | R13 | ∞ | d13= 0.210 | ndg 1.5168 | vg 64.20 | 3.086 |
| S14 | R14 | ∞ | d14= A | | | 3.147 |

Reference wavelength = 588 nm

TABLE 6

| | In an imaging status | In a retraction status |
|---|---|---|
| A | 4.431 | 0.500 |

TABLE 7

| | Cone coefficient | Aspheric surface coefficients | | | | |
|---|---|---|---|---|---|---|
| | k | A4 | A6 | A8 | A10 | A12 |
| S1 | 0.0000E+00 | −7.7775E−04 | −7.6229E−04 | 8.5745E−04 | −5.5542E−04 | 2.0217E−04 |
| S2 | 0.0000E+00 | −3.0837E−02 | 2.6168E−02 | −1.6239E−02 | 7.3156E−03 | −2.2242E−03 |
| S3 | 0.0000E+00 | −4.9720E−03 | 2.9577E−02 | −2.5261E−02 | 1.1927E−02 | −3.2761E−03 |
| S4 | 0.0000E+00 | 2.4540E−02 | 1.8011E−02 | −2.8480E−02 | 2.1555E−02 | −1.1561E−02 |
| S5 | 0.0000E+00 | −7.1775E−02 | 3.0009E−02 | −1.3874E−02 | −2.1920E−02 | 3.2451E−02 |
| S6 | 0.0000E+00 | −1.3087E−01 | 5.1248E−02 | 1.6108E−02 | −4.7340E−02 | 3.8062E−02 |
| S7 | 0.0000E+00 | −4.7573E−02 | 2.4783E−02 | 6.9020E−02 | −8.8645E−02 | 5.1323E−02 |
| S8 | 0.0000E+00 | 5.9768E−03 | 2.4952E−02 | −6.5957E−05 | −1.4352E−02 | 9.5323E−03 |
| S9 | 0.0000E+00 | −7.4208E−03 | 2.0765E−02 | −2.3968E−02 | 1.8627E−02 | −1.1160E−02 |
| S10 | 0.0000E+00 | −6.4596E−02 | 7.9102E−02 | −6.2716E−02 | 3.5799E−02 | −1.4686E−02 |
| S11 | 0.0000E+00 | −1.7516E−01 | 1.0203E−01 | −5.0571E−02 | 1.8804E−02 | −5.0196E−03 |
| S12 | 0.0000E+00 | −1.2187E−01 | 5.3180E−02 | −2.1236E−02 | 6.3406E−03 | −1.3513E−03 |

| | Cone coefficient | Aspheric surface coefficients | | | |
|---|---|---|---|---|---|
| | k | A14 | A16 | A18 | A20 |
| S1 | 0.0000E+00 | −4.3318E−05 | 5.2903E−06 | −3.3181E−07 | 7.4062E−09 |
| S2 | 0.0000E+00 | 4.3177E−04 | −5.0646E−05 | 3.2436E−06 | −8.6424E−08 |
| S3 | 0.0000E+00 | 4.8621E−04 | −2.6722E−05 | −1.5502E−06 | 1.8942E−07 |
| S4 | 0.0000E+00 | 4.6093E−03 | −1.2568E−03 | 2.0139E−04 | −1.4044E−05 |
| S5 | 0.0000E+00 | −1.8031E−02 | 5.1932E−03 | −7.7463E−04 | 4.7459E−05 |
| S6 | 0.0000E+00 | −1.6639E−02 | 4.2281E−03 | −5.8849E−04 | 3.4805E−05 |
| S7 | 0.0000E+00 | −1.7330E−02 | 3.5090E−03 | −3.9304E−04 | 1.8485E−05 |
| S8 | 0.0000E+00 | −2.7668E−03 | 3.1234E−04 | 1.7840E−05 | −5.2113E−06 |
| S9 | 0.0000E+00 | 4.3379E−03 | −1.0057E−03 | 1.1588E−04 | −4.0102E−06 |
| S10 | 0.0000E+00 | 4.0956E−03 | −7.3338E−04 | 7.5836E−05 | −3.4173E−06 |
| S11 | 0.0000E+00 | 9.1638E−04 | −1.0809E−04 | 7.4427E−06 | −2.2746E−07 |
| S12 | 0.0000E+00 | 1.9529E−04 | −1.7993E−05 | 9.4322E−07 | −2.1127E−08 |

TABLE 8

| | |
|---|---|
| 2ω (°) | 46.54 |
| FNO | 2.40 |
| f (mm) | 11.695 |
| f1 (mm) | 6.140 |
| f2 (mm) | −10.467 |
| f3 (mm) | −57.700 |
| f4 (mm) | 57.492 |
| f5 (mm) | −100.000 |
| f6 (mm) | −100.000 |
| TTL (mm) in the imaging status | 11.100 |
| TTL (mm) in the imaging status | 7.169 |
| IH (mm) | 5.120 |
| TTL/IH in the imaging status | 2.168 |
| TTL/IH in the imaging status | 1.400 |

As shown in Table 13, Embodiment 2 satisfies the conditions (1) to (8).

Figure 4:
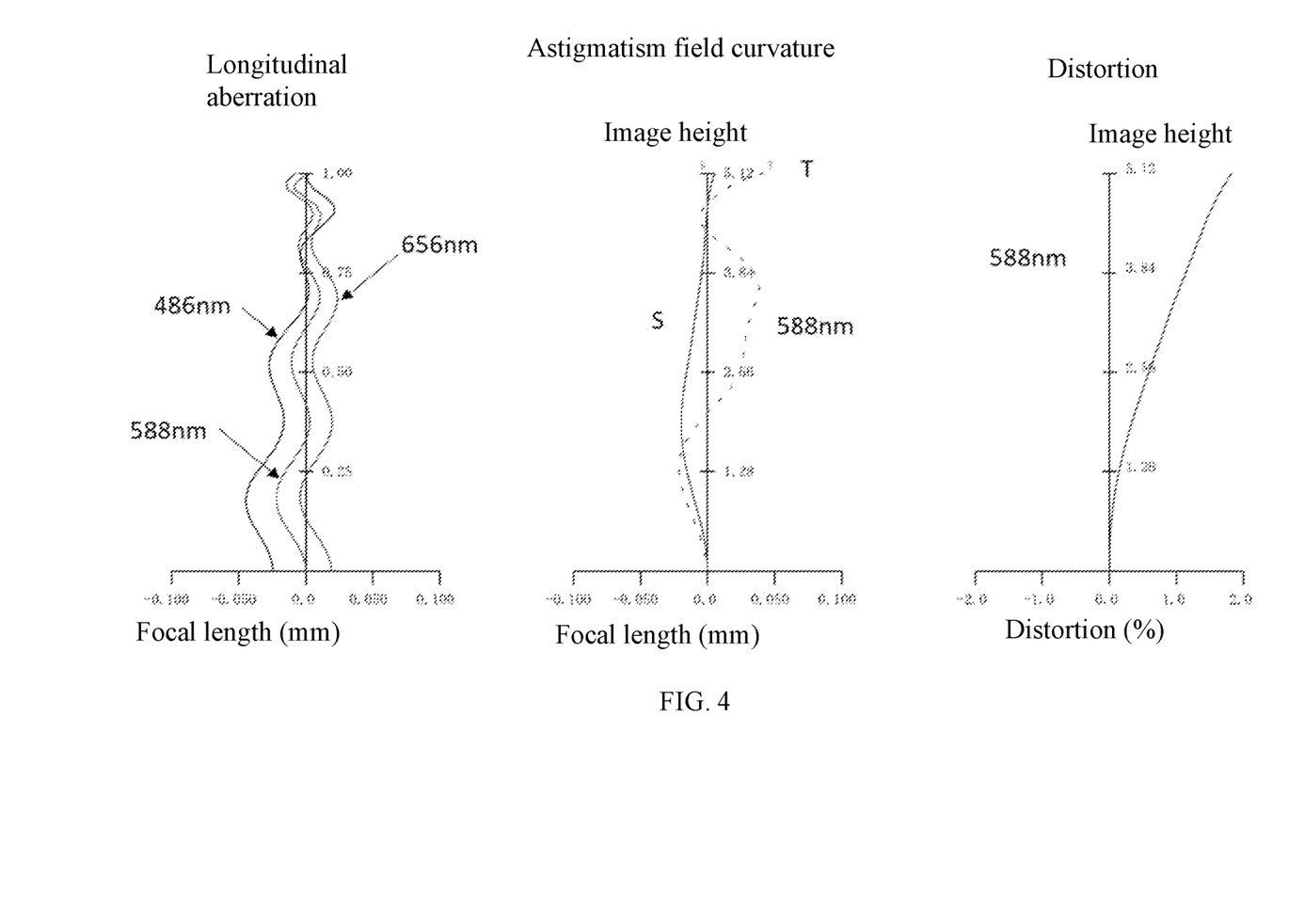
FIG. 4 is a schematic diagram of a longitudinal aberration, an astigmatism field curvature and a distortion of the camera lens shown in FIG. 3.

FIG. 4 illustrates a spherical aberration, an astigmatism field curvature, and a distortion of the camera lens LA2 according to Embodiment 2. As shown in FIG. 4, The camera lens LA2 according to Embodiment 2 has a narrow angle of 2ω=46.54°, and a small height in the retraction status, i.e., TTL/IH=1.400, and good optical properties.

Embodiment 3

Figure 5:
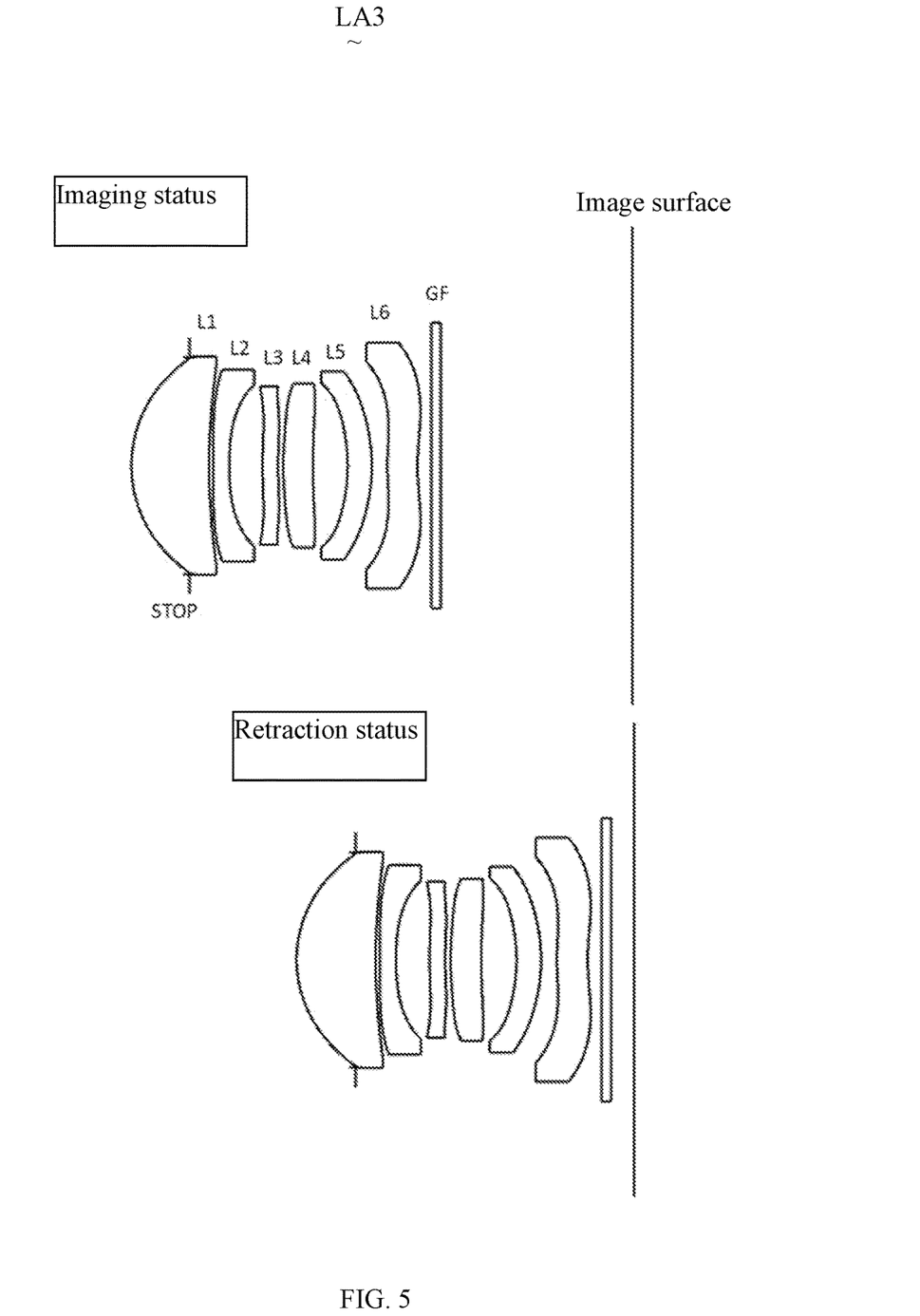
FIG. 5 is a schematic diagram of a general structure of a camera lens in accordance with Embodiment 3 of the present invention.

FIG. 5 is a schematic diagram of a camera lens LA3 according to Embodiment 3 of the present invention, which illustrates the configurations of the camera lens LA3 in an imaging status and a retraction status separately. Central curvature radiuses R of an image side surfaces and object side surfaces of a first lens L1 to a sixth lens L6 of the camera lens LA3 according to the Embodiment 2, center thicknesses of the lenses, or distances d between the lenses, refractive indexes nd, abbe numbers vd are shown in Table 9; values of A are shown in Table 10; conic coefficients k and aspheric coefficients are shown in Table 11; and 2ω, FNO, f, f1, f2, f3, f4, f5, f6, TTL, and IH are shown in Table 12.

TABLE 9

|  |  | R |  | d |  | nd |  | vd | Effective radius (mm) |
|---|---|---|---|---|---|---|---|---|---|
| Stop |  | ∞ | d0= | −1.286 |  |  |  |  | 2.380 |
| S1 | R1 | 2.69142 | d1= | 1.721 | nd1 | 1.5444 | v1 | 55.82 | 2.382 |
| S2 | R2 | 9.78699 | d2= | 0.100 |  |  |  |  | 2.171 |
| S3 | R3 | −60.11203 | d3= | 0.350 | nd2 | 1.6359 | v2 | 23.82 | 2.097 |
| S4 | R4 | 6.44692 | d4= | 0.731 |  |  |  |  | 1.751 |
| S5 | R5 | 10.89617 | d5= | 0.343 | nd3 | 1.6501 | v3 | 21.44 | 1.720 |
| S6 | R6 | 7.24839 | d6= | 0.117 |  |  |  |  | 1.726 |
| S7 | R7 | 5.86785 | d7= | 0.658 | nd4 | 1.6152 | v4 | 25.94 | 1.787 |
| S8 | R8 | 13.80671 | d8= | 0.772 |  |  |  |  | 1.750 |
| S9 | R9 | −3.74872 | d9= | 0.533 | nd5 | 1.6700 | v5 | 19.39 | 1.800 |
| S10 | R10 | −4.21732 | d10= | 0.348 |  |  |  |  | 2.051 |
| S11 | R11 | 5.78764 | d11= | 0.670 | nd6 | 1.5444 | v6 | 55.82 | 2.274 |
| S12 | R12 | 4.62466 | d12= | 0.300 |  |  |  |  | 2.696 |
| S13 | R13 | ∞ | d13= | 0.210 | ndg | 1.5168 | vg | 64.20 | 3.054 |
| S14 | R14 | ∞ | d14= | A |  |  |  |  | 3.119 |

Reference wavelength = 588 nm

TABLE 10

|  | In an imaging status | In a retraction status |
|---|---|---|
| A | 4.247 | 0.500 |

TABLE 11

|  | Cone coefficient | Aspheric surface coefficients | | | | |
|---|---|---|---|---|---|---|
|  | k | A4 | A6 | A8 | A10 | A12 |
| S1 | 0.0000E+00 | −4.8278E−04 | −9.8016E−04 | 9.4468E−04 | −5.6686E−04 | 2.0094E−04 |
| S2 | 0.0000E+00 | −2.8501E−02 | 2.6020E−02 | −1.6320E−02 | 7.3106E−03 | −2.2234E−03 |
| S3 | 0.0000E+00 | −8.2781E−04 | 2.9475E−02 | −2.5384E−02 | 1.1920E−02 | −3.2725E−03 |
| S4 | 0.0000E+00 | 2.8969E−02 | 2.3519E−02 | −4.0580E−02 | 4.0149E−02 | −2.8386E−02 |
| S5 | 0.0000E+00 | −4.4774E−02 | 5.2474E−02 | −6.3920E−02 | 4.7643E−02 | −2.5136E−02 |
| S6 | 0.0000E+00 | −1.1428E−01 | 1.3820E−01 | −1.2966E−01 | 7.5046E−02 | −2.5992E−02 |
| S7 | 0.0000E+00 | −8.3372E−02 | 1.0506E−01 | −8.5607E−02 | 4.2344E−02 | −1.0748E−02 |
| S8 | 0.0000E+00 | −1.5014E−02 | 1.7904E−02 | −1.7576E−02 | 1.1131E−02 | −5.7054E−03 |
| S9 | 0.0000E+00 | 2.4161E−04 | 1.8437E−02 | −2.5934E−02 | 1.9825E−02 | −1.1533E−02 |
| S10 | 0.0000E+00 | −3.1941E−02 | 4.5445E−02 | −3.3888E−02 | 1.6242E−02 | −5.4221E−03 |
| S11 | 0.0000E+00 | −1.0512E−01 | 5.8852E−02 | −3.2106E−02 | 1.3364E−02 | −3.9724E−03 |
| S12 | 0.0000E+00 | −6.8805E−02 | 2.5103E−02 | −9.6501E−03 | 2.9611E−03 | −6.6330E−04 |

|  | Cone coefficient | Aspheric surface coefficients | | | |
|---|---|---|---|---|---|
|  | k | A14 | A16 | A18 | A20 |
| S1 | 0.0000E+00 | −4.3161E−05 | 5.3308E−06 | −3.3117E−07 | 6.0227E−09 |
| S2 | 0.0000E+00 | 4.3211E−04 | −5.0601E−05 | 3.2400E−06 | −8.7879E−08 |
| S3 | 0.0000E+00 | 4.8695E−04 | −2.6708E−05 | −1.5646E−06 | 1.8858E−07 |
| S4 | 0.0000E+00 | 1.3836E−02 | −4.2627E−03 | 7.3742E−04 | −5.4114E−05 |
| S5 | 0.0000E+00 | 9.6775E−03 | −2.5112E−03 | 3.8371E−04 | −2.5885E−05 |
| S6 | 0.0000E+00 | 5.1073E−03 | −3.9489E−04 | −3.2764E−05 | 6.1583E−06 |
| S7 | 0.0000E+00 | 5.3294E−04 | 4.0886E−04 | −9.8543E−05 | 7.1627E−06 |
| S8 | 0.0000E+00 | 2.2765E−03 | −6.2336E−04 | 1.0026E−04 | −7.0051E−06 |
| S9 | 0.0000E+00 | 4.5669E−03 | −1.1473E−03 | 1.6476E−04 | −1.0210E−05 |
| S10 | 0.0000E+00 | 1.1920E−03 | −1.5366E−04 | 9.2898E−06 | −1.0239E−07 |
| S11 | 0.0000E+00 | 7.9513E−04 | −9.9343E−05 | 6.7732E−06 | −1.8239E−07 |
| S12 | 0.0000E+00 | 1.0178E−04 | −9.9993E−06 | 5.6045E−07 | −1.3487E−08 |

TABLE 12

| | |
|---|---|
| 2ω (°) | 47.53 |
| FNO | 2.40 |
| f (mm) | 11.422 |
| f1 (mm) | 6.282 |
| f2 (mm) | −9.138 |
| f3 (mm) | −34.586 |
| f4 (mm) | 16.080 |
| f5 (mm) | −92.607 |
| f6 (mm) | −53.051 |
| TTL (mm) in the imaging status | 11.100 |
| TTL (mm) in the retraction status | 7.353 |
| IH (mm) | 5.120 |
| TTL/IH in the imaging status | 2.168 |
| TTL/IH in the retraction status | 1.436 |

As shown in Table 17, Embodiment 3 satisfies the conditions (1) to (7).

Figure 6:
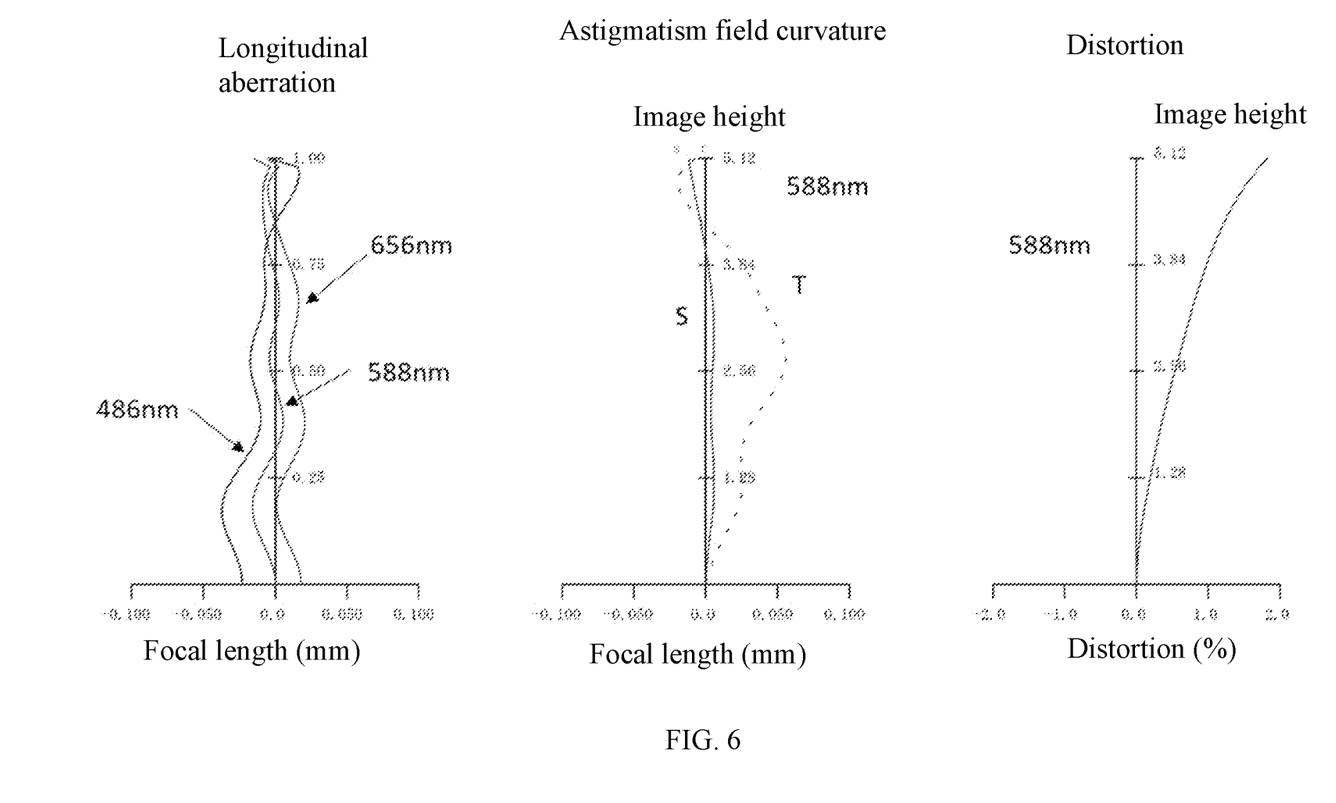
FIG. 6 is a schematic diagram of a longitudinal aberration, an astigmatism field curvature and a distortion of the camera lens shown in FIG. 5.

FIG. 6 illustrates a spherical aberration, an astigmatism field curvature, and a distortion of the camera lens LA3 according to Embodiment 3. As shown in FIG. 6, The camera lens LA3 according to Embodiment 3 has a narrow angle of 2ω=47.53°, and a small height in the retraction status, i.e., TTL/IH=1.436, and good optical properties.

Embodiment 4

Figure 7:
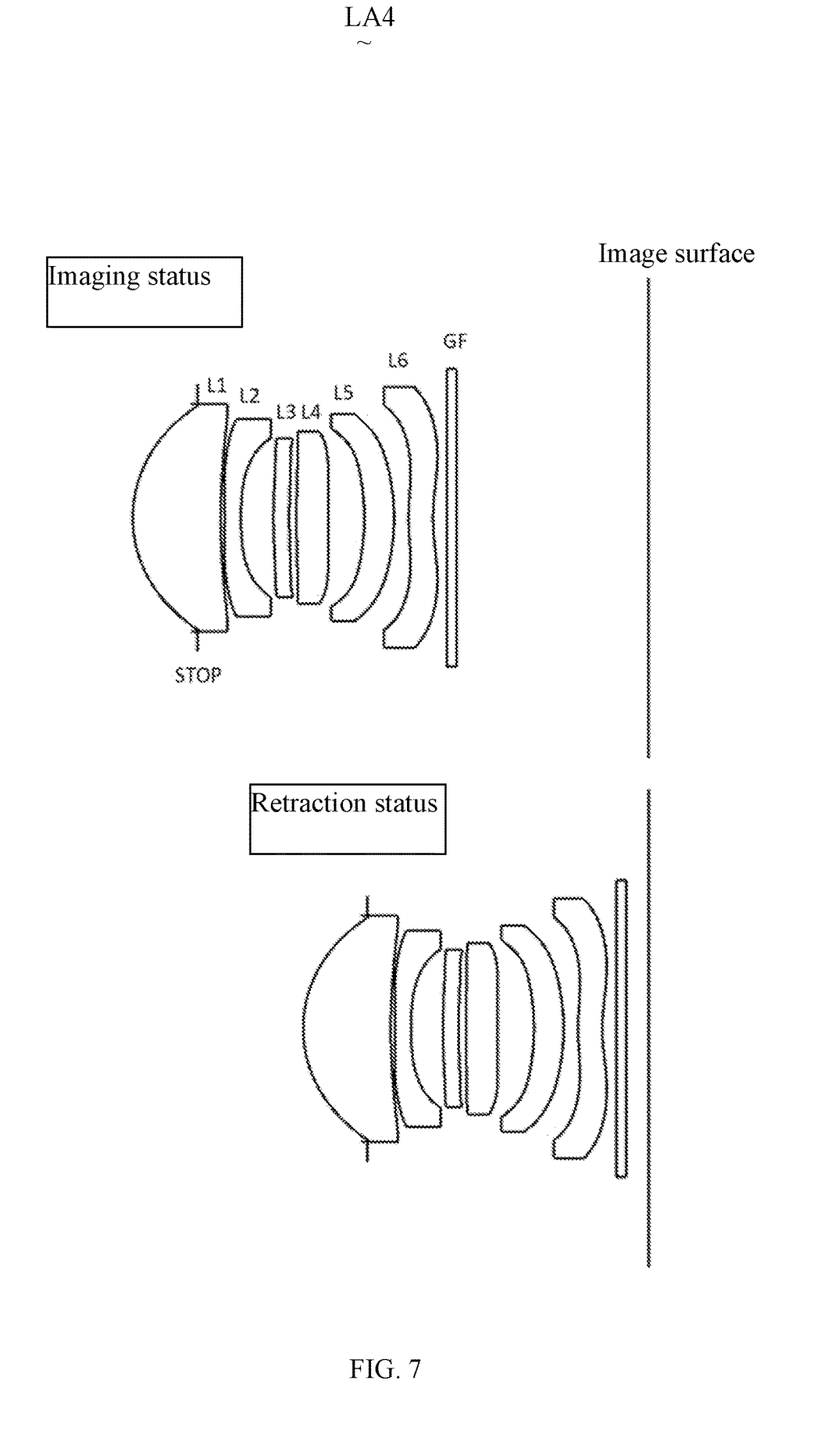
FIG. 7 is a schematic diagram of a general structure of a camera lens in accordance with Embodiment 4 of the present invention.

FIG. 7 is a schematic diagram of a camera lens LA4 according to Embodiment 4 of the present invention, which illustrates the configurations of the camera lens LA4 in an imaging status and a retraction status separately. Central curvature radiuses R of an image side surfaces and object side surfaces of a first lens L1 to a sixth lens L6 of the camera lens LA4 according to the Embodiment 2, center thicknesses of the lenses, or distances d between the lenses, refractive indexes nd, abbe numbers vd are shown in Table 13; values of A are shown in Table 14; conic coefficients k and aspheric coefficients are shown in Table 15; and 2ω, FNO, f, f1, f2, f3, f4, f5, f6, TTL, and IH are shown in Table 16.

TABLE 13

| | | R | | d | | nd | | vd | Effective radius (mm) |
|---|---|---|---|---|---|---|---|---|---|
| Stop | | ∞ | d0= | −1.396 | | | | | 2.472 |
| S1 | R1 | 2.69948 | d1= | 1.894 | nd1 | 1.5444 | v1 | 55.82 | 2.477 |
| S2 | R2 | 9.81630 | d2= | 0.090 | | | | | 2.252 |
| S3 | R3 | −38.33633 | d3= | 0.350 | nd2 | 1.6359 | v2 | 23.82 | 2.144 |
| S4 | R4 | 6.83565 | d4= | 0.691 | | | | | 1.728 |
| S5 | R5 | 10.38012 | d5= | 0.341 | nd3 | 1.6700 | v3 | 19.39 | 1.720 |
| S6 | R6 | 12.12128 | d6= | 0.158 | | | | | 1.690 |
| S7 | R7 | 30.09932 | d7= | 0.677 | nd4 | 1.5661 | v4 | 37.71 | 1.700 |
| S8 | R8 | 70.82193 | d8= | 0.785 | | | | | 1.874 |
| S9 | R9 | −4.70461 | d9= | 0.642 | nd5 | 1.6610 | v5 | 20.53 | 1.939 |
| S10 | R10 | −4.63041 | d10= | 0.310 | | | | | 2.247 |
| S11 | R11 | 4.89784 | d11= | 0.528 | nd6 | 1.5444 | v6 | 55.82 | 2.442 |
| S12 | R12 | 3.75987 | d12= | 0.300 | | | | | 2.840 |
| S13 | R13 | ∞ | d13= | 0.210 | ndg | 1.5168 | vg | 64.20 | 3.178 |
| S14 | R14 | ∞ | d14= | A | | | | | 3.240 |

Reference wavelength = 588 nm

TABLE 14

|   | In an imaging status | In a retraction status |
|---|---|---|
| A | 4.125 | 0.500 |

TABLE 15

| | Cone coefficient | Aspheric surface coefficients | | | | |
|---|---|---|---|---|---|---|
| | k | A4 | A6 | A8 | A10 | A12 |
| S1 | 0.0000E+00 | −4.2561E−04 | −9.1881E−04 | 9.0985E−04 | −5.6550E−04 | 2.0137E−04 |
| S2 | 0.0000E+00 | −2.8214E−02 | 2.5726E−02 | −1.6318E−02 | 7.3164E−03 | −2.2226E−03 |
| S3 | 0.0000E+00 | 2.4869E−03 | 2.9728E−02 | −2.5456E−02 | 1.1913E−02 | −3.2711E−03 |
| S4 | 0.0000E+00 | 3.3333E−02 | 2.2697E−02 | −3.3896E−02 | 3.1511E−02 | −2.0902E−02 |
| S5 | 0.0000E+00 | −3.1270E−02 | 4.1317E−02 | −5.2861E−02 | 4.6982E−02 | −2.9937E−02 |
| S6 | 0.0000E+00 | −3.8961E−02 | 5.2129E−02 | −4.6876E−02 | 1.9736E−02 | −1.8805E−03 |
| S7 | 0.0000E+00 | −1.0574E−02 | 2.3692E−02 | −1.7144E−02 | −4.7760E−03 | 1.1922E−02 |
| S8 | 0.0000E+00 | 2.1706E−03 | −4.0322E−03 | 3.6476E−03 | −9.8730E−03 | 8.9522E−03 |
| S9 | 0.0000E+00 | 1.3319E−02 | −3.0821E−03 | −5.8292E−03 | 2.9843E−03 | −8.3447E−04 |
| S10 | 0.0000E+00 | −1.0922E−02 | 2.2746E−02 | −1.9150E−02 | 8.6882E−03 | −2.6397E−03 |
| S11 | 0.0000E+00 | −9.3845E−02 | 4.8261E−02 | −2.3968E−02 | 8.8153E−03 | −2.2599E−03 |
| S12 | 0.0000E+00 | −7.7042E−02 | 2.8856E−02 | −1.0934E−02 | 3.2147E−03 | −6.7956E−04 |

| | Cone coefficient | Aspheric surface coefficients | | | |
|---|---|---|---|---|---|
| | k | A14 | A16 | A18 | A20 |
| S1 | 0.0000E+00 | −4.3178E−05 | 5.3155E−06 | −3.3259E−07 | 6.5684E−09 |
| S2 | 0.0000E+00 | 4.3203E−04 | −5.0657E−05 | 3.2291E−06 | −8.4694E−08 |
| S3 | 0.0000E+00 | 4.8699E−04 | −2.6807E−05 | −1.5804E−06 | 1.9566E−07 |
| S4 | 0.0000E+00 | 9.6890E−03 | −2.8429E−03 | 4.6498E−04 | −3.1448E−05 |
| S5 | 0.0000E+00 | 1.3367E−02 | −3.8668E−03 | 6.4516E−04 | −4.7088E−05 |
| S6 | 0.0000E+00 | −1.3934E−03 | 5.1980E−04 | −5.1800E−05 | −1.0588E−06 |
| S7 | 0.0000E+00 | −6.7461E−04 | 1.9083E−03 | −2.7498E−04 | 1.5945E−05 |
| S8 | 0.0000E+00 | −4.3026E−03 | 1.1836E−03 | −1.7687E−04 | 1.1191E−05 |
| S9 | 0.0000E+00 | −2.9933E−05 | 9.2357E−05 | −2.3873E−05 | 2.0838E−06 |
| S10 | 0.0000E+00 | 5.2278E−04 | −6.0547E−05 | 3.2142E−06 | −2.3989E−08 |
| S11 | 0.0000E+00 | 3.8232E−04 | −3.9422E−05 | 2.1124E−06 | −3.9529E−08 |
| S12 | 0.0000E+00 | 9.7992E−05 | −9.0784E−06 | 4.8305E−07 | −1.1134E−08 |

TABLE 16

| | |
|---|---|
| $2\omega$ (°) | 47.73 |
| FNO | 2.30 |
| f (mm) | 11.370 |
| f1 (mm) | 6.253 |
| f2 (mm) | −9.096 |
| f3 (mm) | 100.000 |
| f4 (mm) | 91.919 |
| f5 (mm) | 100.000 |
| f6 (mm) | −35.537 |
| TTL (mm) in the imaging status | 11.100 |
| TTL (mm) in the retraction status | 7.475 |
| IH (mm) | 5.120 |
| TTL/IH in the imaging status | 2.168 |
| TTL/IH in the retraction status | 1.460 |

Figure 8:
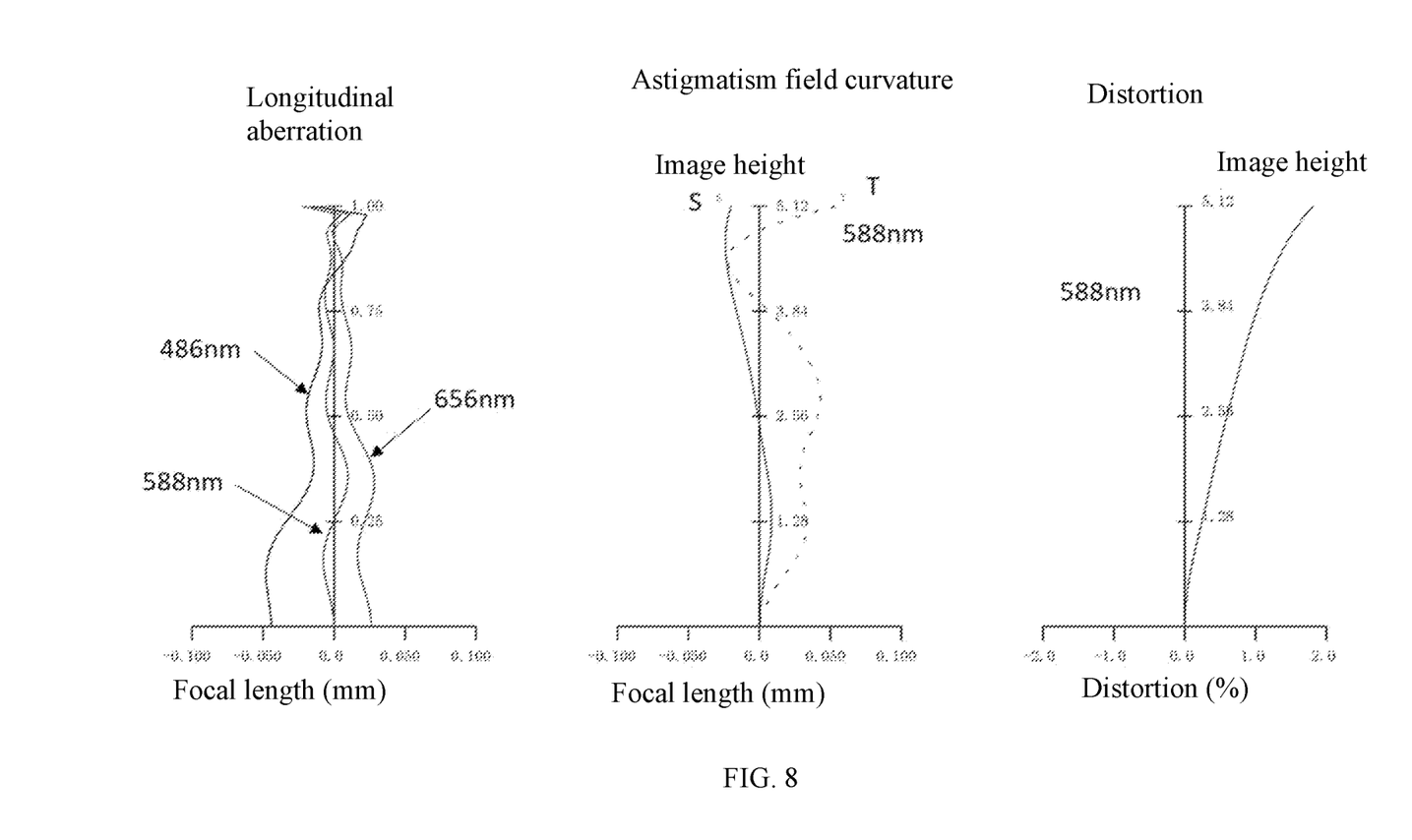
FIG. 8 is a schematic diagram of a longitudinal aberration, an astigmatism field curvature and a distortion of the camera lens shown in FIG. 7.

FIG. 8 illustrates a spherical aberration, an astigmatism field curvature, and a distortion of the camera lens LA4 according to Embodiment 4. As shown in FIG. 8, The camera lens LA4 according to Embodiment 4 has a narrow angle of $2\omega=47.73°$, and a small height in the retraction status, i.e., TTL/IH=1.460, and good optical properties.

The Table 17 shows the corresponding values of the parameters defined in the conditions (1) to (7) of Embodiments 1-4.

TABLE 17

| | Embodiment 1 | Embodiment 2 | Embodiment 3 | Embodiment 4 | Notes |
|---|---|---|---|---|---|
| Imaging status (TTL/LB) | 2.395 | 2.246 | 2.333 | 2.395 | Condition (1) |
| R1/R2 | 0.345 | 0.205 | 0.275 | 0.275 | Condition (2) |
| d5/f | 0.035 | 0.025 | 0.030 | 0.030 | Condition (3) |
| f2/f | −0.705 | −0.895 | −0.800 | −0.800 | Condition (4) |
| DL36/ TTL (Imaging status) | 0.325 | 0.295 | 0.310 | 0.310 | Condition (5) |
| R7/R8 | 0.105 | 0.545 | 0.425 | 0.425 | Condition (6) |
| f1/f | 0.575 | 0.525 | 0.550 | 0.550 | Condition (7) |

It can be appreciated by one having ordinary skills in the art that the description above is only embodiments of the present invention. In practice, the one having ordinary skills in the art can make various modifications to these embodiments in forms and details without departing from the scope of the present invention.

What is claimed is:

1. A camera lens with six-piece lens, comprising, from an object side to an image side in sequence: a first lens having a positive refractive power, a second lens having a negative refractive power, a third lens, a fourth lens having a positive refractive power, a fifth lens, and a sixth lens having a negative refractive power, and the camera lens satisfies following conditions:

in an imaging status, $TTL/LB \leq 2.40$;
$0.20 \leq R1/R2 \leq 0.35$;
$0.02 \leq d5/f \leq 0.04$;
$-0.90 \leq f2/f \leq -0.70$; and
$0.10 \leq R7/R8 \leq 0.55$, where TTL denotes an on-axis distance from an object side surface of the first lens to an image surface of the camera lens along an optical axis, LB denotes a back focal length of the camera lens, R1 denotes a central curvature radius of the object side surface of the first lens, R2 denotes a central curvature radius of an image side surface of the first lens, d5 denotes a center thickness of the third lens, f denotes a focal length of the camera lens, f2 denotes a focal length of the second lens, R7 denotes a central curvature radius of an object side surface of the fourth lens, and R8 denotes a central curvature radius of an image side surface of the fourth lens.

2. The camera lens according to claim 1, wherein, the camera lens further satisfies a following condition:

$0.29 \leq DL36/TTL$ (in the imaging status) $\leq 0.33$, where DL36 denotes an on-axis distance from an object side surface of the third lens to an image side surface of the sixth lens.

3. The camera lens according to claim 1, wherein, the camera lens further satisfies a following condition:

$0.52 \leq f1/f \leq 0.58$, where f1 denotes a focal length of the first lens.

* * * * *